Patented Jan. 16, 1923.

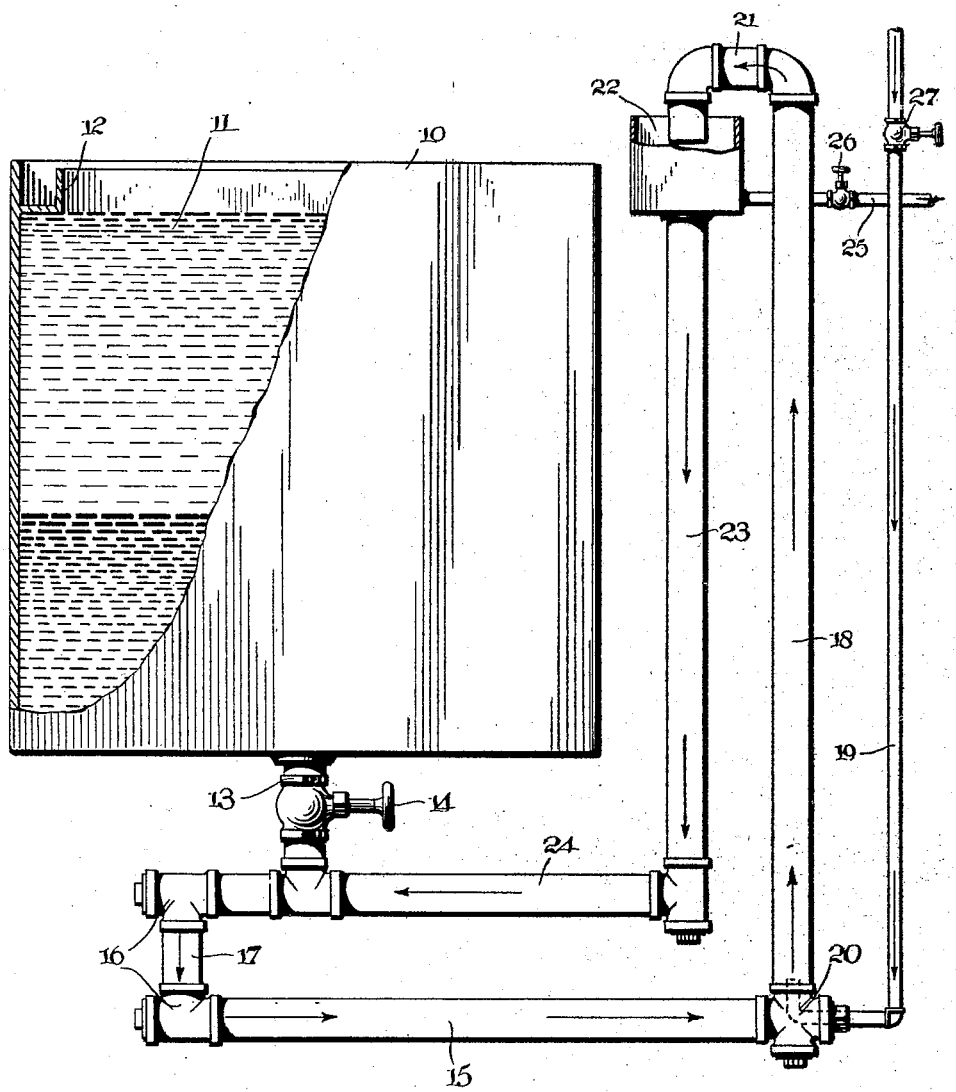

1,442,264

UNITED STATES PATENT OFFICE.

GEORGE THOMAS GERINGER, OF AROROY, PHILIPPINE ISLANDS.

AIR LIFT FOR AGITATORS FOR ORE AND OTHER MATERIALS.

Application filed May 14, 1921. Serial No. 469,471.

*To all whom it may concern:*

Be it known that I, GEORGE T. GERINGER, a citizen of the United States, and a resident of Aroroy, in the Province of Masbate, in the Philippine Islands, have invented certain new and useful Improvements in Air Lifts for Agitators for Ore and Other Materials, of which the following is a specification.

This invention relates to an air lift for agitators for ore and other materials as used in connection with pulp agitating apparatus employed for agitating pulp of any character and particularly in the agitation and aeration of pulp composed of pulverized ore and the necessary solution for dissolving its metallic values and especially in the treatment of pulp formed from pulverized ore and a solution of cyanide of potassium for the purpose of facilitating the dissolving of the metallic values through the action of the chemicals, the device being adapted to thoroughly agitate and aerate the pulp whereby the precious metals to be dissolved are more advantageously subjected to the action of the dissolving chemicals, thus greatly shortening the time during which it is necessary for the ore to remain in contact with the solution.

A further and more specific object of the invention is to provide a device for aerating, agitating and transferring liquids or a mixture of liquids and solids from one container to another, the contents of the containers remaining at fixed levels or levels not varying much from fixed e. g. the aeration, agitation and transfer of ore pulps from one vat to another in the countercurrent decantation system of the cyanidation of ore. The device shall be referred to as "the closed circuit air-lift."

The invention embodies further, a device for the transfer of a mixture of liquids and solids and ore pulp, from one tank or container to another where a steady overflow of clear solution and an underflow of pulp in the container must be simultaneously maintained and particularly where the continuous or circuitous arrangement is produced, as distinguished from old devices in the art, where an open circuit action of the air lift is effected in lieu of a closed circuit action which allows a violent action in the circuit and causes no disturbance in the tank or container where quiet is desired.

With the above objects in view, the invention consists of the combinations and arrangements of parts to be hereinafter more fully described and claimed.

The accompanying drawing is a diagrammatical elevation, partly broken away, of one element of a transfer and agitating device provided with an air lift in accordance with the invention.

Referring to the drawing in detail, the numeral 10 designates a vat, tank or container of a series in which the pulp 11 is contained, said tank being provided adjacent to the ledge thereof with an overflow trough 12 as shown. At the bottom of the container, there is arranged an outlet 13 provided with a control valve 14 designed to discharge through a pipe 15, suitable connections 16 being arranged with a vertical pipe 17 in the illustration. However, it is to be understood that I do not wish to be limited to the specific details of construction and pipe connections shown.

The principal feature is that the pipe 15 which is horizontally arranged forms a connecting pipe from the outlet of the vat or container 10 to an aerating column 18 which is vertically arranged and to the lower end of which the pipe is connected at its end remote from the outlet. A supply pipe for air 19 of much smaller diameter leads laterally through the pipe 15, the inner extremity thereof being extended vertically as indicated at 20, in order to form an ejector or syphon within the column 18, the latter having connection at its upper end above the upper end of the vat or container 10 through a horizontal connection 21 with a receiving and equalling tank 22 of relatively small area and open to the atmosphere. This tank in turn is connected through the outlet or pipe 23 vertically disposed and a pipe 24 horizontally arranged at the lower end thereof, with the outlet 13, thus forming a closed circuit, or continuous arrangement, the operation of which will be hereinafter more particularly pointed out. The bottom portion of the tank 22 is also provided with a discharge or draw-off connection or pipe 25 which is valve controlled as indicated at 26.

Referring to the drawings, the operation of the device is as follows:—

As above stated, the vat or container 10 is one of a series or battery, and in the cycle of operations, air is admitted to the column 18 at point 20 through the valve 27 of the pipe 19. The gravity in the column is reduced by aeration and the pressure in the container 10 causes it to rise and pour into the receiving and equaling tank 22. As soon as the excess in the tank 22 has accumulated, enough over that of the column in the vat or container 10, to cause a movement of equalization, the column in the pipe 23 moves toward the outlet 13. The reduction of pressure in the pipe 15, following the progressive aeration in the column 18 will cause both columns to seek admission into the pipe 15; but as the column 23 has not only a slight excess in pressure over the pressure in the vat or container, due to the difference in head, but also the kinetic valve of the moving column, it passes into the pipe 15. As long as these conditions are not disturbed by drawing to the transfer through the discharge 25 by opening the valve 26, there will be motion in the circuitous pipe arrangement or closed circuit through 22, 23, 24, 15 and 18, without motion in or from the pulp contained in the vat or container 10. But on drawing from the transfer 25, this balance is destroyed by a reduction of the excess static head in the tank 22 and the column 23. This will cause the column in the vat or container 10 to move into the pipe 15, the valve 14 being wide open, through the outlet 13, in direct proportion to the volume drawn at 25. Thus the three functions of aeration, agitation and transfer are accomplished. By calculating the exact diameter of the closed circuit pipes so that their volume greatly exceeds that transferred, more prolonged aeration and agitation can be obtained, if desired. Thus the device may be used for the transfer and mixture of liquids and solids, such as ore pulp from one tank or container to another where a steady overflow of clear solution and an underflow of pulp must be simultaneously maintained. Devices heretofore constructed without the return arrangement have been found very unsatisfactory, owing to the lack of control of the pulp when drawing off due to the necessity of the entire volume of the device going to transfer whereas by the closed circuit action of the air lift and transfer by drawing at 25, in accordance with the present invention, only a section of the volume moved by the lift is drawn off. This allows a very violent action in the circuit but causes no disturbance in the vat or container where quiet is desired at times, whereas heretofore, this has not been possible. In accordance with the air lift used to transfer solutions and pulps in open or direct circuits through the pipes 15 and 18 or the column represented by the latter, the total volume moved in these pipes went to transfer, whereas in the present invention, the air is discharged into the column to form an air lift which enters a receiver open to the atmosphere and in closed circuit, drawing off a section of the moving volume for transfer, as distinguished from the entire volume, so long as the discharge pipe valve is open. It is also to be understood that the draw off or discharge pipe 25 is arranged to discharge into a similar vat or container 10 when the devices are used in a series or battery, instead of in a single unit, as illustrated.

This device possesses distinctive advantages over diaphragm pumps, centrifugal pumps or bucket elevators inasmuch as diaphragm pumps require suitably designed pumps of cast metal with diaphragm valves, connecting rods, power transmission by electric motors, belts, pulleys, line shafts and bearings placed on special supports and requiring attendants in dangerous places. Furthermore, they require regulation either by variable eccentrics, requiring some tools for adjustments, or by cone pulleys.

In the case of diaphragm pumps, special castings or material is required, whereas the present device or closed circuit air-lift permits the devices to be made of standard stock parts requiring no moving valves, eccentrics or connecting rods. The power transmission through the air line can be fastened anywhere and no moving parts such as belts and pulleys that require attention and lubrication in dangerous places, while the regulation is simple by means of two valves that can be placed one within reach of the other and once the device is started, it need not be disturbed. Furthermore, the transfer can be regulated by a valve, no tools or stoppage being required. It also requires less head room and no settling out of heavy material in pile lines can occur because the columns are always moving fast. The cost of upkeep is lower and from a metallurgical point of view as distinguished from the above mechanical differences, the aeration is more thorough and the diaphragm pumps give little aeration by comparison.

In the centrifugal pump, there is required power transmission by electric motor, line shafts or belting, special pump parts, expensive renewals and repairs, variable speeds for regulation and attendants on moving parts. In the present device, the power of transmission through the air line is effective and the lines may be fastened at any convenient place, beside requiring no special pumps or materials, in view of the fact that all the parts are standard parts in stock. The wear is slight and renewals inexpensive while regulation can be very simply effected. In addition there are no moving parts to watch and lubricate, thus rendering the device safer and cheaper to operate. No special belts, buckets or housings are required and the machine is entirely automatic, no spigots or valves being employed in the feed pipe. As no moving parts are employed requiring lubrication the cost of upkeep and attendance is practically nil.

In view of the foregoing it is thought that the operation of the device will be readily understood and in view of the simplicity and practical value that it will commend itself to those skilled in the art.

I claim:—

1. A device for aerating, agitating and transferring liquids or a mixture of liquids and solids from one container to another, comprising a container having an overflow trough at the top thereof, means for supplying separately suitable pulverized ore or concentrates and water or a cyanide solution into the container, a valved discharge for the container, a relatively small tank above the container open to the atmosphere and having communication with said discharge, a vertical column having communication therewith and with said discharge, a valved draw-off for the tank leading from the bottom portion thereof, and an air line leading into the column and extending upwardly therein to discharge air for producing an air lift in the column to cause movement of the fluid therein whereby the pressure in the container together with the excess head in the pipe connecting the container and tank causes the circulation of the fluid, the pressure in the tank being reduced upon drawing off of the mixtures so as to cause discharge from the container, substantially as and for the purposes specified.

2. A device for aerating, agitating and transferring liquids or a mixture of liquids and solids from one container to another, comprising a container having an overflow trough, at the top thereof, means for supplying separately, suitable pulverized ore or concentrates and water or a cyanide solution into the container, a valve discharge for the container, a relatively small tank above the container open to the atmosphere and having communication with said discharge, a vertical column having communication therewith and with said discharge, a valved draw-off for the tank, leading from the bottom portion thereof, an air line leading into the column and extending upwardly therein to discharge air for producing an air lift in the column to cause movement of the fluid therein, a valve in the draw off and a valve in the air supply pipe adjacent to the latter valve.

3. A device for aerating, agitating and transferring liquids or a mixture of liquids and solids from one container to another, comprising a container adapted to contain suitable pulverized ore or concentrates and water or a cyanide solution, a discharge for the container, a tank above the container open to the atmosphere and having communication with said discharge, a column having communication with said discharge and emptying into said tank, a draw-off for the tank, means for discharging a fluid injector upwardly in the column to cause movement of the fluid therein, and a valve in the draw-off.

4. An apparatus of the character described comprising a relatively elevated tank, a vertical column discharging at its upper end into the tank, a main container provided with an outlet at its lower end, a conduit leading from said first tank to the outlet of said second tank, a conduit leading from the outlet of said main container to the lower end of said vertical column, and means for discharging air upwardly into said vertical column at the lower end of the latter.

5. A closed-circuit air lift for the transfer of a mixture of liquids and solids, such as ore pulps from one container to another, comprising a container having a bottom outlet, a tank above the container and having connection at the bottom thereof with the bottom of the container, a vertical column having communication with the top of the tank and with said outlet, a draw-off for the tank, and an air pipe leading into the bottom of the column for discharging air into the same, so as to establish a continuous circulation, whereby a steady underflow of mixed pulp and solution is obtained at the bottom of the container.

6. In combination a container having an outlet at the bottom, an auxiliary container having a pipe connection with the said outlet, a draw-off leading from said auxiliary container, an additional pipe leading from the outlet to the auxiliary tank and an airlift in the last named pipe to cause a circulation between said auxiliary container and the outlet of the first container.

7. In combination a tank having an outlet at the bottom and an overflow trough at the top, an auxiliary tank having pipe connections with the outlet at the bottom of the first tank, and provided with a draw-off leading directly therefrom, a conduit forming a fluid connection leading from the outlet to the auxiliary tank to discharge into the latter, said latter tank being open at the top, and a fluid injector operating upwardly in the last named conduit to cause a circulation between said auxiliary tank and the outlet of the first tank to produce a steady overflow of clear solution from the first tank and an underflow of mixed pulp and solution from the first tank.

GEORGE THOMAS GERINGER.